B. BRIDENDOLPH.
Horse Rake.
No. 22,526.
Patented Jan. 4, 1859.
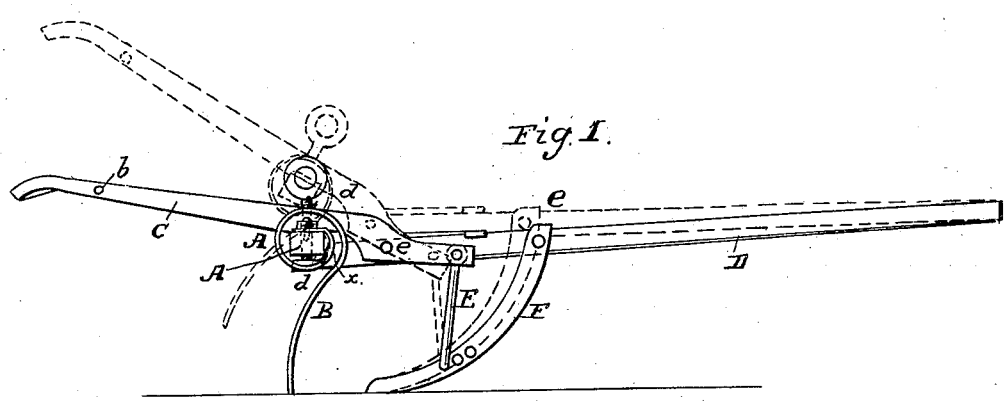
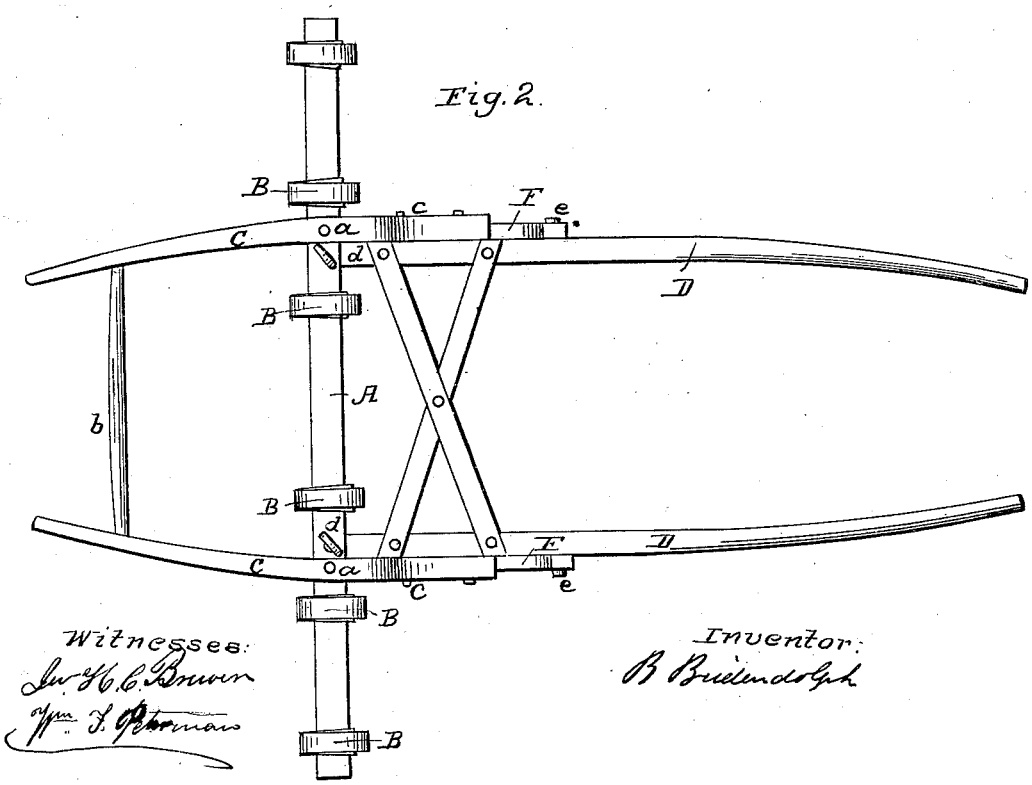

UNITED STATES PATENT OFFICE.

B. BRIDENDOLPH, OF CLEAR SPRING, MARYLAND, ASSIGNOR TO HIMSELF AND O. K. BOVEY, OF SAME PLACE.

IMPROVEMENT IN HORSE-RAKES.

Specification forming part of Letters Patent No. 22,526, dated January 4, 1859.

*To all whom it may concern:*

Be it known that I, B. BRIDENDOLPH, of Clear Spring, in the county of Washington and State of Maryland, have invented a new and Improved Horse-Rake; and I do hereby declare that the following is a full, clear, and exact description of the same, reference being had to the annexed drawings, making a part of this specification, in which—

Figure 1 is a side view of my invention. Fig. 2 is a plan or top view of the same.

Similar letters of reference indicate corresponding parts in the two figures.

This invention consists in a novel manner of constructing the rake, as hereinafter fully shown and described, whereby the implement, even when in motion, may be readily unloaded or emptied of its contents, the teeth of the rake rendered capable of being adjusted the desired height from the surface of the ground, and the implement as a whole rendered extremely simple and efficient, readily manipulated, of light draft, economical to manufacture, without being liable to get out of repair.

To enable those skilled in the art to fully understand and construct my invention, I will proceed to describe it.

A represents a rectangular bar which forms the rake-head, and to which the teeth B are attached. The teeth B are formed of flat steel strips, the upper ends of which are bolted to the upper surface of the bar A, and coiled around the rake-head or bar, as shown clearly in Fig. 1, in order to give a certain degree of elasticity to the teeth, the lower parts of the teeth being tapered to a point. Any proper number of teeth may be used, as occasion may require.

To the bar or rake-head A two handles, C C, are attached, as shown at *a*. The handles near their outer ends are connected by a traverse-bar, *b*, and the handles near their front ends are connected by bolts or pivots *c* to shafts D, one handle being attached to each shaft. (See Fig. 2.) The inner ends of the shafts D pass underneath the rake-head or bar A, and set-screws *d* pass through the bar A and rest or bear on the shafts D, as shown at *d'*. The front ends of the handles C C are connected by rods or links E to runners F, which are of curved form, and have their upper ends attached each by a bolt, *e*, to the shafts D, the runners being allowed to work freely on the bolts *e*, and their lower ends resting or bearing on the ground.

The shafts, rake-head, and handles are or may be of wood. The teeth are of steel, as previously stated. The rods or links E are of metal.

The operation is as follows: As the machine is drawn along, the operator has hold of the handles C C, the teeth B being adjusted so that their lower ends will run as close to the ground as desired by regulating the set-screws *d d*. The cut grass or grain in the path of the machine is raked up by the teeth B, and when the hollow of the rake is full the operator raises the handles C, and the teeth B, in consequence of the connection of the handles C with the shafts, as shown, move upward and backward, and the front ends of the handles C and the rods or links E move backward, as shown in red, Fig. 1. This upward movement of the handles, it therefore will be seen, causes the load to be discharged or freed immediately from the rake, the teeth B, moving upward and backward, afford a free exit for the load, while the backward movement of the front ends of the handles and the rods E tends to force the load outward underneath the teeth. The back ends of the shafts D are also elevated simultaneously with the movement of the teeth and handles, and this movement of the shafts also tends in a considerable degree to favor the free discharge of the load as the space in front of the rake-teeth is expanded or increased, and all tendency to compress the load or the grass or grain is avoided as the parts move to effect its discharge. It will be seen therefore that the load may be discharged with facility, and immediately on raising the outer ends of the handles C C the speed of the implement does not require to be checked in order to discharge the load properly. The teeth B cannot become injured or strained in consequence of penetrating the ground; nor can they rake up trash—such as weeds, the refuse of preceding crops, as cornstalks, roots, and the like—as the teeth may be adjusted, as previously stated, by regulating the set-screws $d\ d$. The load also may be discharged without great effort on the part of the operator.

Having thus described my invention, what I claim as new, and desire to secure by Letters Patent, is—

The arrangement, substantially as shown, of the handles C C, rake-head A, shafts D D, runners F F, and links or rods E, for the purpose set forth.

B. BRIDENDOLPH.

Witnesses:
JAS. H. C. BREWER,
WM. T. PETERMAN.